Patented Feb. 9, 1937

2,069,903

UNITED STATES PATENT OFFICE 2,069,903

INSULATING MATERIAL HAVING A HIGH DIELECTRIC CONSTANT AND A PROCESS OF PRODUCING SAME

Werner Soyck, Berlin-Pankow and Alfred Ungewiss, Berlin-Halensee, Germany

No Drawing. Application December 27, 1935, Serial No. 56,374. In Germany December 14, 1934

9 Claims. (Cl. 106—12)

This invention relates to an insulating material having a high dielectric constant and to a process of producing same, and is particularly concerned with preparing an insulating material of this kind which represents a novel composition and contains titanium dioxide.

Insulating materials containing a considerable portion of titanium dioxide to attain a high dielectric constant have been developed already, particularly for condensers, and introduced into engineering practice. For example, insulating materials containing titanium dioxide in quantities of 70% to 90% and more and disclosing a dielectric constant of 40 to 90 are known. Whereas these substances show a low dielectric loss at high frequency—at $10^6$ cycles per second the power factor equals .1% to .15%, the corresponding figures at low frequency (800 cycles per second) are $100$–$300.10^{-4}$. Moreover, the dielectric losses considerably increase with the temperature, the loss factor amounting for instance at $10^6$ cycles per second and 200° C. already to $100\times10^{-4}$. A very favorable dielectric behavoir is shown, however, by some insulating materials consisting substantially of magnesium titanate, though the dielectric constant of such substances is relatively low and about within the range of 10 to 20.

The invention provides a group of insulating materials, within which substances disclosing low to high dielectric constants and slight losses at high and low frequency can be produced. A further advantage afforded by the new substances is that the dependence of the phase angle upon temperature is slight.

The invention attains these ends by providing the insulating materials with a simultaneous content of titanium dioxide and zirconium dioxide. To what extent these two substances chemically combine during ceramic vitrification of the mixture has not been ascertained as yet, though the fact that the insulating materials produced by baking from such mixtures disclose the above-mentioned surprisingly favorable dielectric properties has been satisfactorily established by dielectric measurements.

The relative proportions of zirconium dioxide and titanium dioxide are preferably about as 1:2 to 1:8. The total share of the two dioxides amounts approximately to 40%–90% of the mixture, so that 10 to 60 parts by weight remain for adding admixtures, plasticizers and fluxes. Alkaline-earth fluxes are to be preferred, and a particularly favorable effect can be attained by the admixture of magnesia or equivalent magnesia compounds. The zirconium dioxide share cannot be increased at will, as refractoriness and thus the vitrification temperature of the substance would be extraordinarily enhanced thereby. If, however, the proportions stated are maintained, vitrification between 1350° and 1600° C. is possible.

The following example relates to a mass composed according to the invention:

| | Parts by weight |
|---|---|
| $TiO_2$ | 70 |
| $ZrO_2$ | 20 |
| Clay substance | 5 |
| Alkaline-earth carbonate | 2 |

A substance composed according to this example discloses at 300 m. wave-length a dielectric loss factor of $3\times10^{-4}$; at 800 cycles per second the loss factor is $5\times10^{-4}$ and the dielectric constant, 50.

There are no strict rules governing the form in which the zirconium dioxide is introduced into the mass, as that depends upon the extent to which plastic substances are present in the batch, and the zirconium dioxide can therefore be introduced as a more or less aqueous hydroxide or as calcined oxide. The use of chemically pure zirconia compared with that of the natural product yields a higher dielectric constant and lower losses of the dielectric.

The advantageous properties of the new insulating materials are indicated in the following table, in which the physical properties of known insulating materials comprising a high percentage of titanium dioxide or consisting substantially of magnesium titanate are compared with those of a substance containing zirconium dioxide according to the invention:

| | Dielectric constant ($\xi$) | Power factor as below times $10^{-4}$ at 300 m. | Power factor as below times $10^{-4}$ $f$=800 cycles per second |
|---|---|---|---|
| Titanium dioxide mass I | 80 | 10, 15 | 300 |
| Titanium dioxide mass II | 40 | 15, 20 | 100 |
| Magnesium titanate mass | 15 | 2 | 10 |
| Masses according to invention | 20–60 | 2–10 | 2–30 |

The proportion of titanium dioxide and zirconium dioxide is chosen according to the desired properties of the insulating material, an increase of the zirconium dioxide share at the expense of titanium dioxide lowering the dielectric constant while reducing the dependence thereof upon temperature.

We claim:—

1. A process of producing an insulating material of high dielectric constant, consisting in preparing a ceramic batch containing a substantial amount of a mixture of titanium dioxide and zirconium dioxide and in which the amount of titanium dioxide is materially greater than the amount of zirconium dioxide, working the batch and firing it to vitrification.

2. A process in accordance with claim 1 and in which the amount of zirconium dioxide is at least one-eighth as much as the titanium dioxide and not more than one-half as much as titanium dioxide.

3. A process in accordance with claim 1 and in which the titanium dioxide and zirconium dioxide mixture constitutes at least 40% of the batch and not more than 90% of the batch.

4. A process in accordance with claim 1 and in which a batch is employed containing alkaline earth flux.

5. A process of making an insulating material of high dielectric constant, consisting in preparing a ceramic batch comprising titanium dioxide, zirconium dioxide, and alkaline earth flux, the said dioxides constituting from 40% to 90% of the entire batch and the amount of zirconium dioxide being from one-eighth to one-half the amount of titanium dioxide, working the batch and firing it to vitrification.

6. A process in accordance with claim 5 and in which the batch contains clay in an amount not greater than the amount of zirconium dioxide.

7. A vitrified ceramic insulating material having a high dielectric constant and containing titanium and zirconium compounds, the amount of these compounds, calculated as dioxides, constituting from 40% to 90% of the entire material, and the titanium being substantially in excess of the zirconium.

8. Material in accordance with claim 7 and in which the amount of zirconium dioxide is from one-eighth to one-half the amount of titanium dioxide.

9. Material in accordance with claim 7 and made from a batch containing a fluxing magnesium compound.

WERNER SOYCK.
ALFRED UNGEWISS.